Sept. 16, 1958     E. R. CORNEIL     2,852,186
CENTRIFUGAL SEPARATOR FOR IMMERSION IN A FLUID BODY
Filed June 16, 1955
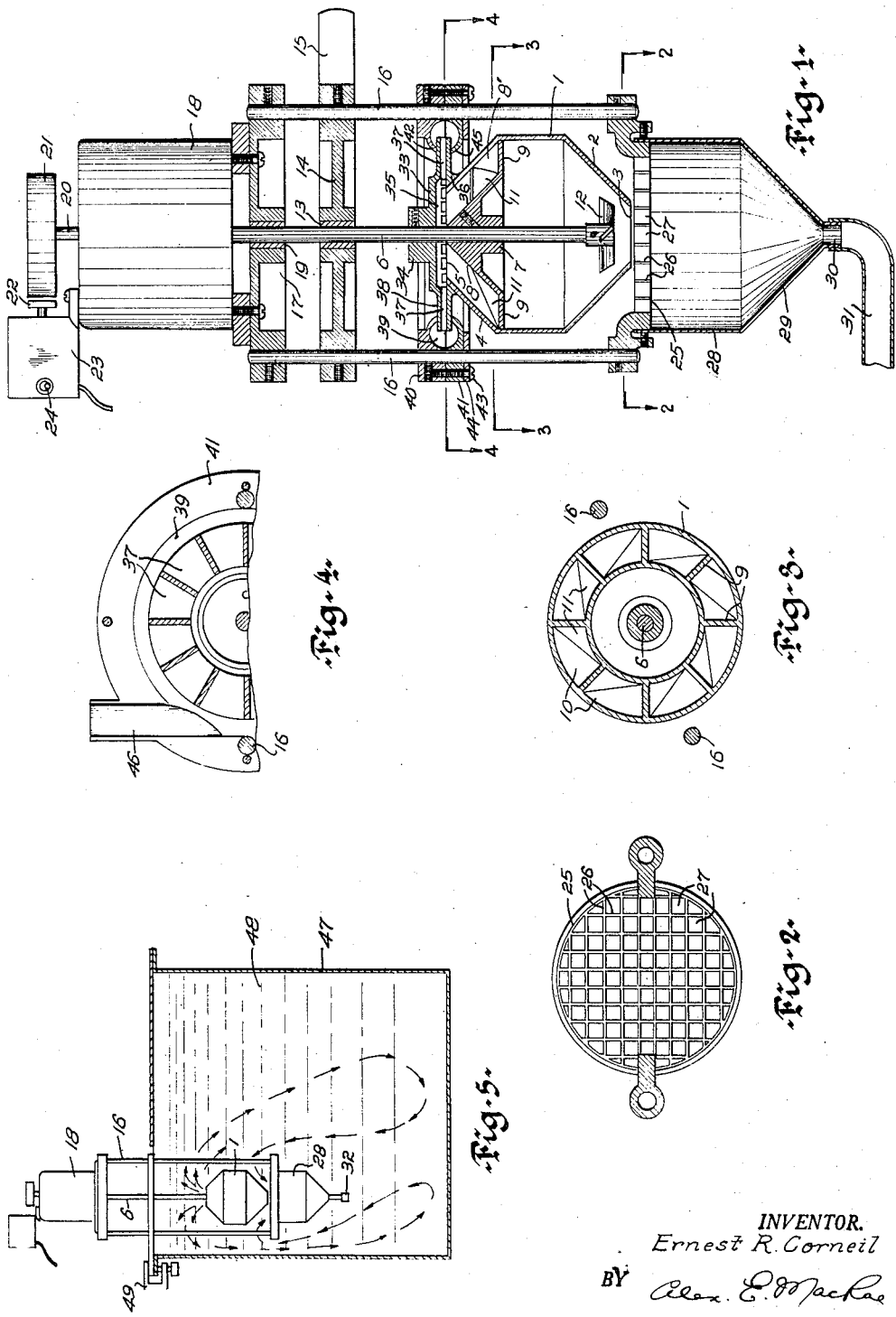
INVENTOR.
Ernest R. Corneil
BY Alex. E. MacRae
Attorney.

United States Patent Office 2,852,186
Patented Sept. 16, 1958

2,852,186

CENTRIFUGAL SEPARATOR FOR IMMERSION IN A FLUID BODY

Ernest R. Corneil, Thorold, Ontario, Canada

Application June 16, 1955, Serial No. 515,930

6 Claims. (Cl. 233—27)

This invention relates to a process and apparatus for centrifugally separating heavy components from fluids containing the same.

Several forms of commercial machines are available to carry out existing processes for centrifugal filtering of fluids to remove heavy components therefrom. However, equipment for proving such processes is expensive. It is not easily applied by untrained personnel. The cleaning operations require dismantling of the machines and the manual removal of solid residues. Much equipment is available for stirring, agitating and pumping of fluids. Often the driving means may be adopted to actuate various types of revolving tools. There is need for a tool which may be readily applied to such driving means for actuation thereby to demonstrate the efficiency of the centrifugal filtering process. Most centrifugal processes as carried out in conjunction with reaction vessels and like equipment are effected by means external or accessory to such equipment. This requires the transfer of solutions from a reaction zone through valves and piping to the centrifugal equipment and in many cases back to the reaction zone. Then too, it may be desirable to retain the heavier particles within a chamber, due to their processing effect. These would otherwise be lost through their overflow from the vessel. External separation of such heavy particles and their readdition presents opportunity for contamination and loss of effectiveness.

It has thus become increasingly desirable to perform separating processes within the atmosphere or environment of reaction or storage vessels, and at the temperature and pressure of this atmosphere or environment. This is exceedingly difficult with conventional equipment. Then too, agitating equipment is required to provide uniform conditions throughout to keep the heavier components distributed wherever they enter into the process whereas such agitation could be furnished by the rotating parts of a centrifugal separator. The continuous purification of lubricating oils in internal combustion engines involves the pumping of the oil externally of the engine through a filtering means. This constitutes a maintenance and disposal problem which can be eliminated were the oil filtered internally of the engine and the sludge retained in a sump for disposal at such times as the engine lubricant is changed. The purification of air or other gases, circulated by blowers and fans through static filters, is space consuming and costly. Pressure loss due to the resistance of the filter medium is also involved. The present invention seeks to eliminate these disadvantages.

An object of the invention is to provide a process and apparatus for centrifugally separating particles of heavy material within autoclaves, engines, tanks and like apparatus normal to the chemical and power industry and to concentrate or segregate such heavy particles. Another object is to provide simple centrifugal filtering tools which may be applied to existing power means to permit demonstration or practice of the centrifugal process within laboratory or plant vessels. A further object is the provision of a centrifugal separation process which may be carried on automatically and continuously within a body of fluid to prevent the transfer of heavy particles with the overflow from such fluid body. Still another object is the provision of centrifugal filtering apparatus which may be immersed into a body of liquid to collect and retain any heavy particles of contaminating nature and which may be lifted from the liquid thereby to remove the contaminating particles therefrom. Still a further object is to provide a centrifugal separation process wherein heavy particles are removed from primary collecting surfaces by the angular velocity of the fluid in contact with such heavy particles.

Other objects, details and advantages of the invention will become apparent as this description proceeds with particular reference to the accompanying drawing, in which, Figure 1 is a sectional elevation of a centrifugal separating device in accordance with the invention, Figure 2 is a sectional view on line 2—2 of Figure 1, Figure 3 is a sectional view on line 3—3 of Figure 1, Figure 4 is a partial sectional view on line 4—4 of Figure 1, and Figure 5 is a diagrammatic elevation, partly in section, of a typical application of the device.

Referring to the drawing, 1 is a cylindrical bowl having a conical bottom portion 2 converging inwardly to an axial inlet 3, and a conical top portion 4 converging inwardly to an axial discharge outlet 5 of somewhat greater diameter than that of inlet 3. Bowl 1 is suspended upon the lower end portion of a shaft 6, which is normally vertically disposed and in axial relation to the bowl, by means of a hub 7. Hub 7 has an outwardly and downwardly inclined upper wall 8 and is fixed to the bowl by means of a plurality of spokes 9 having openings 10 therebetween. Wall 8 forms with top portion 4 an inwardly inclined passage 8' with which openings 10 communicate. A plurality of fins 11 are provided between spokes 9 in passage 8'. As shown, spokes 9 are fixed to the bowl adjacent the lower end of top portion 4. Preferably, the shaft extends into the bowl to a point adjacent the lower end of bottom portion 2, and an impeller or agitator 12 having a plurality of inclined blades is mounted on the lower end of the shaft in closely adjacent relation to the inlet 3. Shaft 6 extends through a bearing 13 in a support plate 14 having mounting means 15. A plurality of vertically disposed supporting rods 16 are fixed to plate 14 in circumferentially spaced relation to each other. Fixed to the upper ends of rods 16 above plate 14 is a motor support plate 17. A motor 18 is mounted on plate 17 and is arranged to drive shaft 6, which extends through a bearing 19 in plate 17.

The motor 18 is provided with any suitable source of power for energization thereof to drive shaft 6. Means for stopping or starting revolution of shaft 6 may comprise a shaft extension 20, a brake drum 21 fixed to shaft extension 20 and a brake shoe 22 engageable with drum 21 and carried by a solenoid mounted in frame 23. Actuation of the solenoid may be controlled by switch 24.

Suspended from the lower ends of rods 16 is a grid-like frame 25 which is horizontally disposed in close proximity to inlet 3. The frame 25 comprises a plurality of vertically arranged spaced strips 26 providing a plurality of passages 27 therebetween.

Suspended from frame 25 is a cylindrical vessel or receiver 28 having an inwardly inclined or conical lower portion 29. Portion 29 has an axial outlet 30, which may be connected to a discharge pipe 31 or closed by means of a cap 32.

Means to collect and externally discharge fluids passing upwardly through outlet 5 comprises an impeller or rotor 33 having a hub 34 fixed to shaft 6. Impeller 33 has a shallow recess 35 provided with a circular lip 36 which fits closely about the edge of top portion 4 defining outlet 5. Impeller 33 is also provided with a plurality of passages 37 extending radially outwardly from recess 35 and formed in the peripheral portion 38 of the impeller. Passages 37 discharge into a concentrically arranged chamber 39 formed by upper and lower housing members 40 and 41. As shown, housing member 40 is mounted on rods 16 and has a lip 42 bearing upon the upper surface of portion 38. Housing member 41 is fixed to member 40 by means of screws 43 which preferably extend through a backing plate 44. Member 41 has a lip 45 which bears upon the lower surface of portion 38. Preferably, lip 45 is formed of a resilient plastic material. Chamber 39 has a tangentially arranged outlet 46 to which piping may be connected.

Referring to Figure 5, the centrifugal separating device described is shown as mounted in a tank 47 containing liquid 48 from which solid particles are to be removed. As shown, a clamp 49 engaging mounting means 15 fixes the device to the rim of the tank with the bowl 1 and associated parts immersed in the body of liquid and the motor 18 disposed above the tank. The rotor 33 may be omitted, as shown in Figure 5.

In operation, with the motor energized, the switch 24 is actuated to release the brake and permit revolution of the shaft 6 and consequently bowl 1. Since the diameter of inlet 3 is less than that of outlet 5, a differential pressure is created which causes liquid to spill over outlet 5 into the tank. This loss of liquid causes liquid to flow through inlet 3 and, due to the proximity of grid 25 through guide passages 27 therein directly below inlet 3. The liquid flowing upwardly into the bowl 1 causes similar quantities to flow downwardly into vessel 28 through passages 27 adjacent the peripheral portion of grid 25. The change in direction causes a first separation of particles which settle into vessel 28. Particles from the body of liquid within bowl 1 will also be subjected to centrifugal action which causes the particles to settle upon the inside surfaces of bowl 1. The clarified liquid passes through inlet 3 and outlet 5 and back into the body of liquid 48, thus further diluting the concentration of particles therein. After a period of operation, heavy solid particles either collect in vessel 28 or in a concenrtic ring on the inner surfaces of bowl 1. It may be desirable to remove this concentric ring of particles periodically in order to avoid interference thereby with the operation of the device. The ring may be removed by stopping rotation of bowl 1. The liquid in bowl 1, having an angular momentum, continues to flow around the ring of particles which, being no longer held by centrifugal force, are slurried off into the bowl. Being heavier than the liquid, they settle through inlet 3 and thence into vessel 28. After a period of from one to five minutes, the bowl 1 is again subjected to rotation and the cycle repeated until all the heavy particles have been removed from the liquid in the tank. The apparatus may then be lifted from the tank, the cap 32 removed, and the collected particles in vessel 28 flushed therefrom.

When it is undesirable to remove the device from its operating position in a body of fluid due, for instance, to its size or vacuum or pressure requirements, then the outlet 30 is connected directly to a discharge pipe 31. Flow through the latter pipe may be controlled by pressure relief means externally of the vessel which permits intermittent withdrawal of the concentrated slurry of particles.

When it is desired to continuously withdraw the clarified liquid, the rotor 33 is added to the device shown in Figure 5. In this instance, it will be apparent that liquid flowing out of outlet 5 will be distributed through passages 37 into annular chamber 39. The pressure created by revolution of the rotor will cause the liquid in chamber 39 to flow outwardly through outlet 46.

The rotation of bowl 1 causes the liquid externally adjacent to it to revolve. It has been found that the supporting rods 16, which are closely adjacent to the bowl 1, interfere with this liquid revolution and thus prevent the creation of a vortex over the rim of discharge outlet 5 when unequipped with rotor 33. The interference of these rods 16 also prevents separation of solids externally of the bowl by limiting the rotation of liquid around the bowl and by employing such rotation as an agitating means.

It will also be apparent that the passages 27 in grid 25 maintain a liquid flow into inlet 3 in a direction substantially parallel to the axis of rotation of bowl 1. Such flow guiding means is necessary in order to counteract the effect of the centrifugal action on liquid approaching inlet 3, which can otherwise cause cavitation and limit or suppress the entrance of liquid into the bowl. The grid 25 interferes with the rotation of liquid about inlet 3 and causes the liquid to flow through passages 27 in a direction parallel to the axis of the bowl. This prevents cavitation and maintains a uniform entrance velocity of the liquid.

Furthermore, the use of a grid portion extending substantially beyond the inlet 3 prevents any liquid rotation externally of bowl 1 from interfering with a simple settling procedure in vessel 28 because of the guide passages 27 in the peripheral portion of the grid. The change in direction of the heavy particles in the quiescent zone in vessel 28 causes a preliminary settling thereof.

While the device is quite operative without the use of the agitating means 12, its use increases through-put and improves efficiency. It will be observed that the agitating blades are in close proximity to the inner surfaces of bottom portion 2 but are spaced therefrom to leave space for discharge of solids therealong. The agitating blades may be pitched to direct the fluid stream upwardly into the bowl in normal operation. During the deceleration step, since the liquid rotates against the blades in reverse direction, the agitator 12 assists in the discharge of solids. When the bowl commences rotation in a clockwise direction in stagnant liquid, the pitch of the blades as shown causes upward flow of the liquid. In the deceleration stage, when the liquid rotates clockwise, the blades are stationary and the thrust is downward.

The following examples are illustrative of tests conducted with the apparatus of the present invention.

*Example 1*

Apparatus using a bowl having a major diameter of 4¼ inches was suspended in a five gallon container. The bottom inlet was ⅝ inch in diameter and in the plane of a grid having one quarter inch square openings. The depth of the vanes of the grid was three-eighths of one inch and parallel to the axis of a container three inches in diameter and three inches deep. The discharge of the bowl was one and one half inches. Sixteen ounces of Portland cement was shaken with forty lbs. of water and the mixture transferred to the five gallon container. The bowl was then driven at 1725 R. P. M.

The liquid lost its grey color and after seven minutes a sample of the liquid taken near the top of the liquid appeared clear. The bowl was stopped, removed and dismantled. The silt was brushed into the collecting cup which in turn was heated to evaporate all the water. When the container with the dried contents was weighed it was found that 15.93 oz. of solids had been collected.

Again 16 oz. of cement were added to the liquid remaining in the container and mixed. The bowl was again operated at the same speed on a program of two minutes on and one minute off. After five cycles the apparatus was removed. The liquid in the collecting cup was evaporated and the contents weighed. Of the 16 oz., 15.24 were accounted for. The bowl was dismantled and the solids were collected and evaporated to dryness. These solids weighed 0.67 oz.

Example 2

The same apparatus as used in Example 1, was placed into a container to which a mixture of 40 lbs. of fuel oil and 8 ounces of water were added. A cycle of two minutes at 1750 R. P. M. and one minute at rest was used. After five cycles the bowl and collecting cup were carefully removed from the container and the contents of the cup was transferred to a separatory funnel. The water layer was decanted and weighed. It was found that 5.6 oz. of water had been collected.

Eight ounces of water were again added to the liquid in the container and mixed. The cycle of two minutes on and one minute off was used and the apparatus ran for 24 minutes. Again the contents of the collecting cup were transferred to a separatory funnel and the decanted water layer was weighed. It was found that 7.93 oz. of water had been collected.

Example 3

Apparatus consisting of a bowl seven inches in diameter having a two inch inlet and a three inch outlet was mounted and driven at 4200 R. P. M. A grid having one half inch square holes and a depth of one half inch was set close to the inlet and fixed in a ventilating duct. Air was drawn from the duct through the bowl and discharged. In passing, the air was subjected to the rotational speed of the bowl. After continuous operation for twelve hours the apparatus was shut down. The bowl was dismantled and the accumulation of dust particles were carefully collected and weighed. It was found that 17.3 grams had been retained on the inner surfaces of the bowl.

I claim:

1. A centrifugal separator arranged for immersion in a fluid body for separation of heavy components therefrom which comprises a frame, a shaft drivably mounted in the frame, a bowl axially suspended on the shaft for rotation therewith, said bowl having an axially disposed bottom inlet and an axially disposed top outlet, said inlet having a smaller diameter than that of said outlet, a collecting vessel suspended from said frame below said bowl and having a top opening of greater diameter than said bowl inlet, and a grid mounted in said frame below the bowl and having fluid passages therein disposed in a direction parallel to the axis of said bowl, said grid extending across said vessel opening and in close proximity to said bowl inlet.

2. A centrifugal separator as defined in claim 1, said frame comprising a plurality of rods disposed outside the circumference of said bowl and in substantially parallel relation to the axis thereof.

3. A centrifugal separator as defined in claim 1, said bowl having a main cylindrical portion, a top conical portion converging to said outlet, and a bottom conical portion converging to said inlet.

4. A centrifugal separator as defined in claim 1, including a plurality of agitating blades carried by said shaft within said bowl adjacent said inlet, said blades being inclined to direct fluid flow in the bowl from said inlet to said outlet.

5. A centrifugal separator as defined in claim 1, said bowl having a main cylindrical portion, a top conical portion converging to said outlet, a bottom conical portion converging to said inlet, and a hub constituting mounting means for said bowl and said shaft, said hub being disposed within said top portion and having a conical wall in substantially parallel and spaced relation to said top portion to provide an annularly inclined passage therebetween, and a plurality of fins in said passage.

6. A centrifugal separator as defined in claim 1, including a rotor mounted on said shaft for rotation therewith and with said bowl, said rotor surmounting said bowl and engaging the edge of said bowl defining said outlet, said rotor having a recess communicating with said outlet and a plurality of passages extending radially outwardly from said recess, and means forming an annular chamber carried by said frame and in communication with said radial passages.

References Cited in the file of this patent

UNITED STATES PATENTS

| Number | Name | Date |
|---|---|---|
| 660,214 | Gathman | Oct. 23, 1900 |
| 711,155 | Gathman | Oct. 14, 1902 |
| 980,001 | Ponten | Dec. 27, 1910 |
| 1,600,762 | Hawley | Sept. 21, 1926 |
| 1,635,845 | Holford | July 12, 1927 |
| 1,900,394 | Cottrell | Mar. 7, 1933 |
| 2,510,781 | Howard | June 6, 1950 |
| 2,598,746 | Adams | June 3, 1952 |